United States Patent [19]
Murakami et al.

[11] 3,939,928
[45] Feb. 24, 1976

[54] WEIGHING METHOD AND APPARATUS

[75] Inventors: Katsuhiko Murakami, Kyoto; Tetsuo Ikeda, Otsu; Zenjiro Miebori, Muko; Kunio Noguchi, Otsu; Kaoru Nakanishi, Shiga, all of Japan

[73] Assignee: Kabushiki Kaisha Ishida Koki Seisakusyo, Kyoto, Japan

[22] Filed: Oct. 1, 1974

[21] Appl. No.: 511,012

Related U.S. Application Data

[63] Continuation-in-part of Ser. No. 387,314, Aug. 10, 1973, abandoned.

[30] Foreign Application Priority Data

Aug. 12, 1972 Japan.................................. 47-81047

[52] U.S. Cl........................... 177/25; 177/1; 209/121
[51] Int. Cl.²..................... G01G 19/04; B07C 5/16
[58] Field of Search ................ 177/1, 25, 122, 123; 209/121

[56] References Cited

UNITED STATES PATENTS

| | | | |
|---|---|---|---|
| 3,557,889 | 1/1971 | Rejsa ............................. | 177/123 X |
| 3,708,025 | 1/1973 | Soler et al................. | 177/1 |

*Primary Examiner*—George H. Miller, Jr.
*Attorney, Agent, or Firm*—Hall & Houghton

[57] ABSTRACT

A weighing method and apparatus is provided wherein an excessive amount or number of objects to be weighed over the predetermined or target weight is distributed among a plurality of weighing machines and weighed with combinations of actually measured values being obtained from the plurality of weighing machines and calculated, and the combination of weights which is equal to or most approximates that of the target or predetermined weight is selected.

1 Claim, 6 Drawing Figures

WEIGHING METHOD AND APPARATUS

CROSS REFERENCE TO RELATED APPLICATION

This application is a continuation-in-part of copending application Ser. No. 387,314, filed Aug. 10, 1973, which is now abandoned.

BRIEF DESCRIPTION OF THE INVENTION

1. Field Of The Invention

The present invention relates to a weighing method and apparatus wherein divisional calculations are carried out on a plurality of weighing machines, and combinations of actually measured values provided by the individual weighing machines are calculated and a combination of weights which is equal or most approximate to the target value is selected.

2. Description Of The Prior Art

The conventional weighing systems employed heretofore oftentimes possessed errors in measurement due to a head or distance to be traveled by a falling object which is to be weighed, overfeeding of objects resulting from the disturbance of arrangement of the objects being conveyed on a trough, the damping motion of a weighing lever, and variations in the unit-weights of objects to be weighed, hereinafter referred to as single-weights, when the objects are solids or in mass form. It will be noted that particularly when the objects to be weighed are solid or mass form, errors oftentimes occur which will amount to one single-weight.

To provide an explanation of this with actual numerical values, it is to be noted that when a total weight of 150g is to be weighed off, if the single-weights vary in the range of 20–45g, the weighing lever has to execute a displacement corresponding to 150g or more before the feeding of objects can be stopped. If, for example, the weighing lever is set at a position corresponding to 145g, the feed of the objects will not be stopped and hence at least one more object will be fed into the hopper. Thus, if this additional or final object weighs, for example, 45g, then the total weight put into the hopper will be 190g. It will be noted, therefore, that the feed of objects to achieve the predetermined weight results in an excess of 40g over that desired. Thus, with such conventional weighing systems heretofore in use wherein the feed of objects to be measured cannot be stopped unless a displacement corresponding to a preset value is effected, an error corresponding to one single-weight will normally occur. Therefore, where a preset weight value is high or variations in single-weights are great, or the average single-weight is high, the conventional weighing systems heretofore in use have possessed fatal disadvantages.

Another conventional method which has been used heretofore, which may be called a correction charge system, employs a single-weight distribution technique which is divided into several parts which are thereafter pooled in advance for use as correction charges. According to this system, a first-step weighing is carried out to determine the differential weight value and if the operation results in a deficient value, an object to be weighed is taken out of a single-weight division corresponding to the differential weight and is fed into the first-weighed group to correct the weight. A disadvantage of this type of weighing system is that there are limitations on the division of single-weights which result in errors within the divisional range. Further, in dividing or classifying a single-weight distribution into groups for use as correction charges, since such single-weight distribution generally possesses a bias, the amount of objects contained in each division is normally different from the others. However, the amounts of correction charges required are generally uniform, so that each division should have approximately the same amount as the others. Thus, the supply and demand requirement will become unbalanced and if any one of the divisions becomes exhausted, the mechanism cannot be employed any longer.

SUMMARY OF THE INVENTION

The present invention provides a weighing method and apparatus for weighing vegetables and fruits, confectionery articles, secondary products, perishables and other articles having high variations in single-weight with high accuracy to produce packages having a predetermined weight, and, if necessary, impart limitations on the number of things taken at a time.

The weighing system provided in accordance with the present invention is capable of taking measurements with a high degree of accuracy while insuring that variations in a single-weight of the objects do not directly influence the accuracy of the measurement. The system also insures that disturbances in the arrangement or feed of the objects to the weighing hopper of a weighing machine does not result directly to an overfeed of the objects. Further, even if the present weight is high, the accuracy of the measurement of the articles can be maintained at a high level. Because of combinations of actually measured values provided by the individual weighing machines in the practice of the present invention, errors with respect to the setting of the weighing machines will have no effect or influence on the final value. The present invention will be found to be particularly suitable where individual single-weight, single-objects, bags, buckets or the like, which vary in weight, are used and such variances cannot be compensated for in the counting system where the objects must be packed to a predetermined weight. In the present invention, the error curve will be found to be such that values in the vicinity of zero will predominate, which is the ideal condition.

A further advantage of the present invention is that those articles which have fallen outside the optimum combination code selected will remain unused until the next calculation is carried out. Thus, there is no possibility of damaging the articles during the initial weighing operation.

DESCRIPTION OF THE PREFERRED EMBODIMENT

Figure 1:
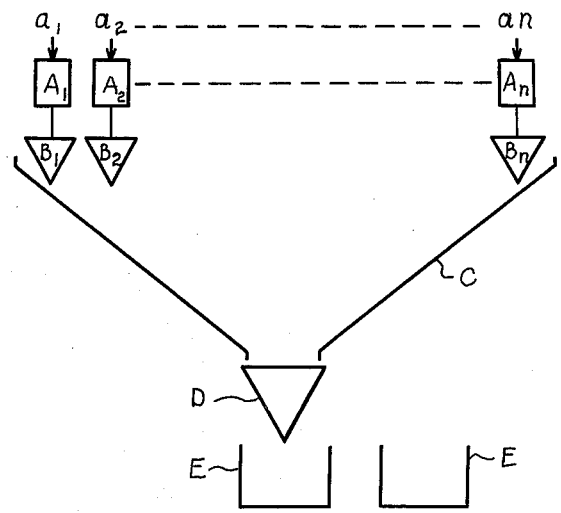
FIG. 1 is a schematic view of an illustrative embodiment of a weighing mechanism made in accordance with the weighing system of the present invention.

FIG. 1 schematically shows an illustrative embodiment of a weighing mechanism made in accordance with the present invention wherein the reference letters A1, A2 . . . A$n$ designate individual weighing machines. The reference letters B1, B2 . . . B$n$ designate the weighing hoppers associated with the weighing machines into which the articles will be fed. Reference letter C designates a common guide chute and the reference letter D designates a single pool hopper associated therewith. The reference letter E designates buckets operatively connected to a packaging machine or the like for delivering articles thereto. Each of the weighing hoppers is provided with an independent feeder (not shown) for feeding objects to be weighed. Such feeders are of a conventional type and are associated with conventional and well known weighing mechanisms. The operation of each feeder is such that its operation will be initiated when the associated weighing hopper becomes empty after the exhaustion of the objects to be weighed therefrom. The feeder will stop its operation after one object or a preset number or a substantially preset weight of objects to be weighed have been fed into its weighing hopper. The guide chute C is positioned so as to collect the objects delivered from the weighing hoppers B1, B2 . . . B$n$ to the pool hopper D. The pool hopper D is so constructed as to open at a predetermined time to discharge the objects collected therein into the bucket E therebelow, as will be later described.

The weighing mechanism A1, A2 . . . A$n$ feed the respective measured values of the objects received in the corresponding weighing hoppers to an electronic computer circuitry, to be described more fully hereinafter, in the form of inputs thereto. For example $a1, a2$ . . . $an$ represent the measured value signals issued by the respective weighing machines A1, A2 . . . A$n$. The electronic computer circuitry as shown in the block diagram in FIG. 2 and as described in detail in FIGS. 3 and 4 consists of first and second adders F and G capable of selectively adding together the delivered measured value signals $a1, a2$ . . . $an$, an addition code selecting circuit H for selecting combinations of addition codes for the first adder F, a comparator I for comparing the outputs from the first and second adders F and G, an addition code memory circuit J for the second adder G for memorizing a combination code most nearly approximating that of the desired preset weight in accordance with the result of comparison provided by the comparator I, and a read circuit K for reading the optimum addition code memorized in the addition code memory circuit J in response to a calculation end signal from the addition code selecting circuit H when all the combinations for the addition codes are completed. It will be so arranged that a signal from the read circuit K will result in the corresponding weighing hoppers to be opened. The term "addition code" as employed herein refers to the manner in which code numbers assigned to the weighing machines or weighing hoppers are combined.

Now, letting $x1, x2$ . . . $xn$ represent the respective code numbers for the weighing machines, it will be seen that the number of combinations of $n$ things taken one at a time will be $n$. Going forward, it will be noted that the number of combinations of $n$ things taken two at a time will be $n(n-1)/(2 \times 1)$. Still further, the number of combinations of $n$ things taken $r$ at a time will be $[n)n-1)(n-2) \ldots (n-r+1)]/r!$. All or some of these combinations are programmed and put in the addition code selecting H of the electronic computer circuitry in advance of operation.

The outputs from the first and second adders F and G of the electronic computer circuitry are placed in the comparator I, each in the form of the absolute value of a preset value subtracted by the respective addend. That is to say, if the preset value is represented by $ao$, the addend to the first adder F by $Fx$ and the addend to the second adder G by $Gx$, then the inputs to the comparator I will be $\alpha = |Ao-Fx|$ and $\beta = |Ao-Gx|$, respectively. The comparator I is to be so arranged that only when $\alpha < \beta$, will it renew the memory code in the addition code member circuit J. In other words, except when $\alpha < \beta$, that is when $\alpha \geq \beta$, the result of the comparison does not extend to the addition code memory circuit J, so that the memory code in the addition code member circuit J will be retained.

The manner of weighing, in which $n$ weighing machines are employed with two of them being taken for combinations to provide a value most approximately that of the preset value $ao$ will now be described. Let $x1, x2$ . . . $xn$ represent the code numbers for the respective weighing machines and $a1, a2$ . . . $an$ represent the measured values provided by such machines. The addition combination codes therefore will be ( X1 + X2 ), ( X1 + X3 ) . . . ( X$n$ − 1 + X$n$ ) and calculations will be carried out in this order by the first adder F. First, in the case of ( X1 − X2 ), the addend to the first adder F is $Fx = (a1 + a2)$ and this addend is placed in the comparator I in the form of $\alpha = |Ao-Fx| = |Ao - (a1 + a2)|$. On the other hand, as for the addend $Gx$ to the second adder C, since the operation is at the start of the first calculation, there is no code memorized in the addition code memory circuit J, so that $Gx = 0$. Thus, the input provided by the second adder G to the comparator I is $\beta = |Ao-Gx| = |Ao-O = Ao|$. Here, $\alpha$ and $\beta$ are compared and the result will be either $\alpha < \beta$ or $\alpha \geq \beta$. If it is $\alpha < \beta$, then the code ( X1 + X2 ) which has been selected by the addition code selecting circuit H is memorized in the addition code memory circuit J by means of the output from the comparator I. The next addend to the first adder F, i.e., ( X1 + X3 ) = Fx = ( $a1 + a3$ ) and the addend $Gx = (a1 + a2)$ to the adder G are then put in the comparator in the form of $\alpha = |Ao-(a1 + a3)|$ and $\beta = |Ao-(a1+a3)|$, respectively. These values will be compared and the result will be $\alpha < \beta$ or $\alpha \geq \beta$. Such an operation will be repeated automatically until all the combinations are completed. On the other hand, in the case of $\alpha \geq \beta$ the memory code in the addition code memory circuit J is not renewed but is carried over to the calculation of the combination for the next code.

In short, $\alpha$ is the absolute value of the error in the addend based on the calculation of the combination in each case with respect to the preset weight, while $\beta$ is the absolute value of the currently minimum value of the error in the addend on the basis of the preceding calculations with respect to the preset weight. That is to say, the addend $Gx$ to the second adder G always represents the most approximate of the previously calculated values to that of the preset weight. Therefore, the addition code memory circuit J will always be memorizing the addition combination code which is most nearly to that of the preset weight. Therefore, it follows that the comparator I compares the addend on the basis of the present combination code with the previous value which was most approximate to the preset weight. Furthermore, the renewal of the memory is effected only when the results of the comparison are such that the present value is more approximate to the preset weight than the previous value. When the calculation of all the combinations is completed in this manner, the addition code selecting circuit H issues a calculation and signal to read the memory code memorized in the addition code memory circuit J, causing the weighing hoppers of those weighing machines which correspond to the code numbers selected in the memory code to open through a code number discriminating circuit or the like. This will result in the objects thus weighed being collected in the pool hopper D by the chute C and then charged into the bucket E. The total weight of the objects will be most approximate to or equals of the predetermined or present weight requirement. In addition, those hoppers which have discharged their contents and are empty will be fed with fresh objects to be weighed, while the remaining weighing hoppers which have not discharged their contents will be ready for the next calculation.

Figure 2:
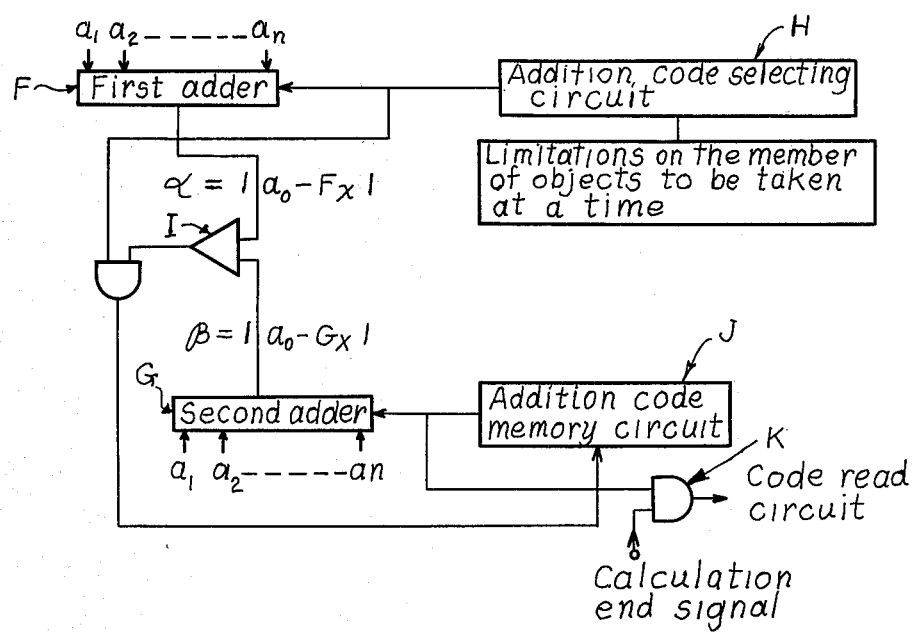
FIG. 2 is a block diagram for an electronic computer circuitry to be employed in the practice of the present invention.
Figure 3:
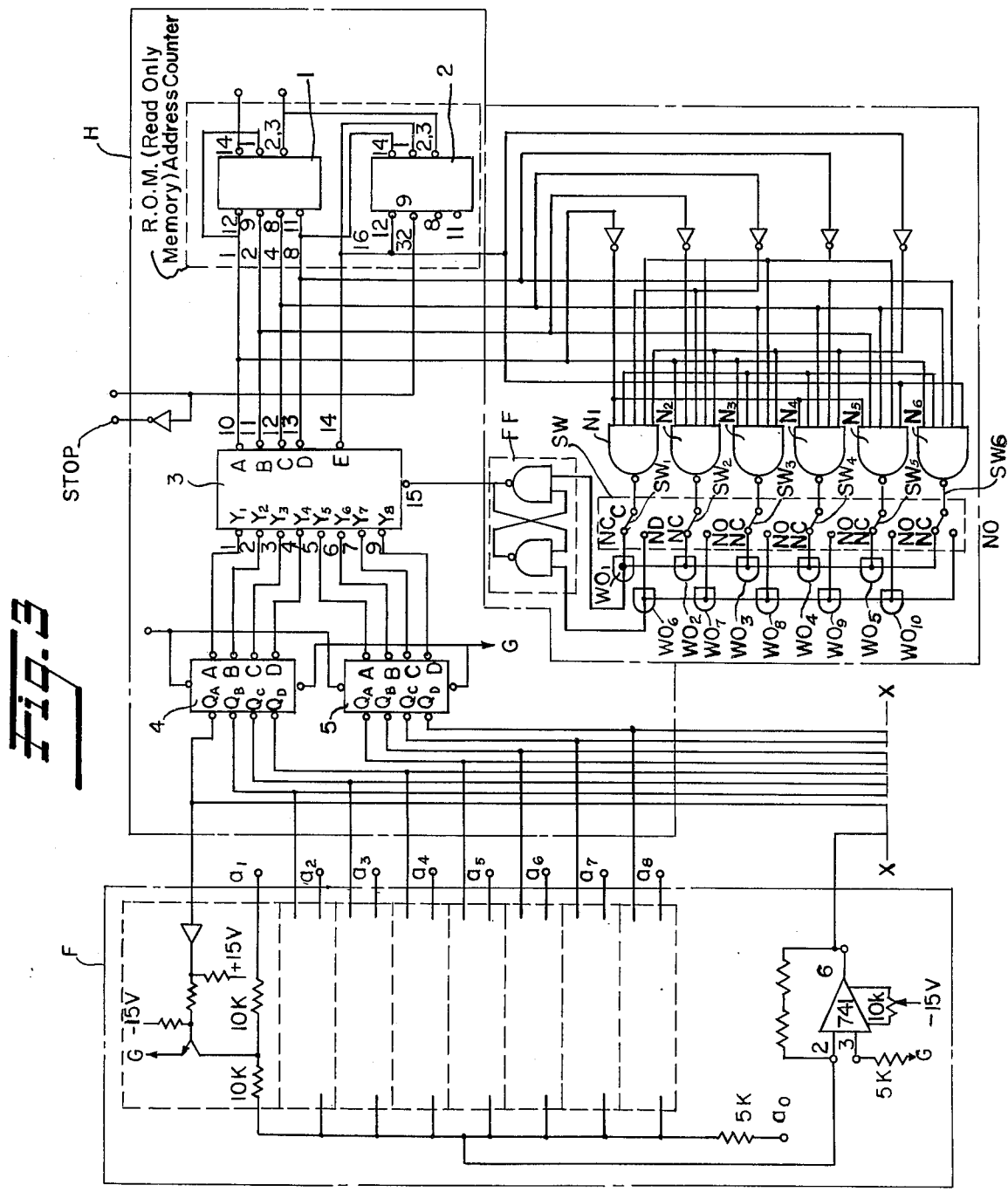
FIG. 3 is a circuit diagram of the first adder F and the addition code selecting circuit shown in FIG. 2.
Figure 4:
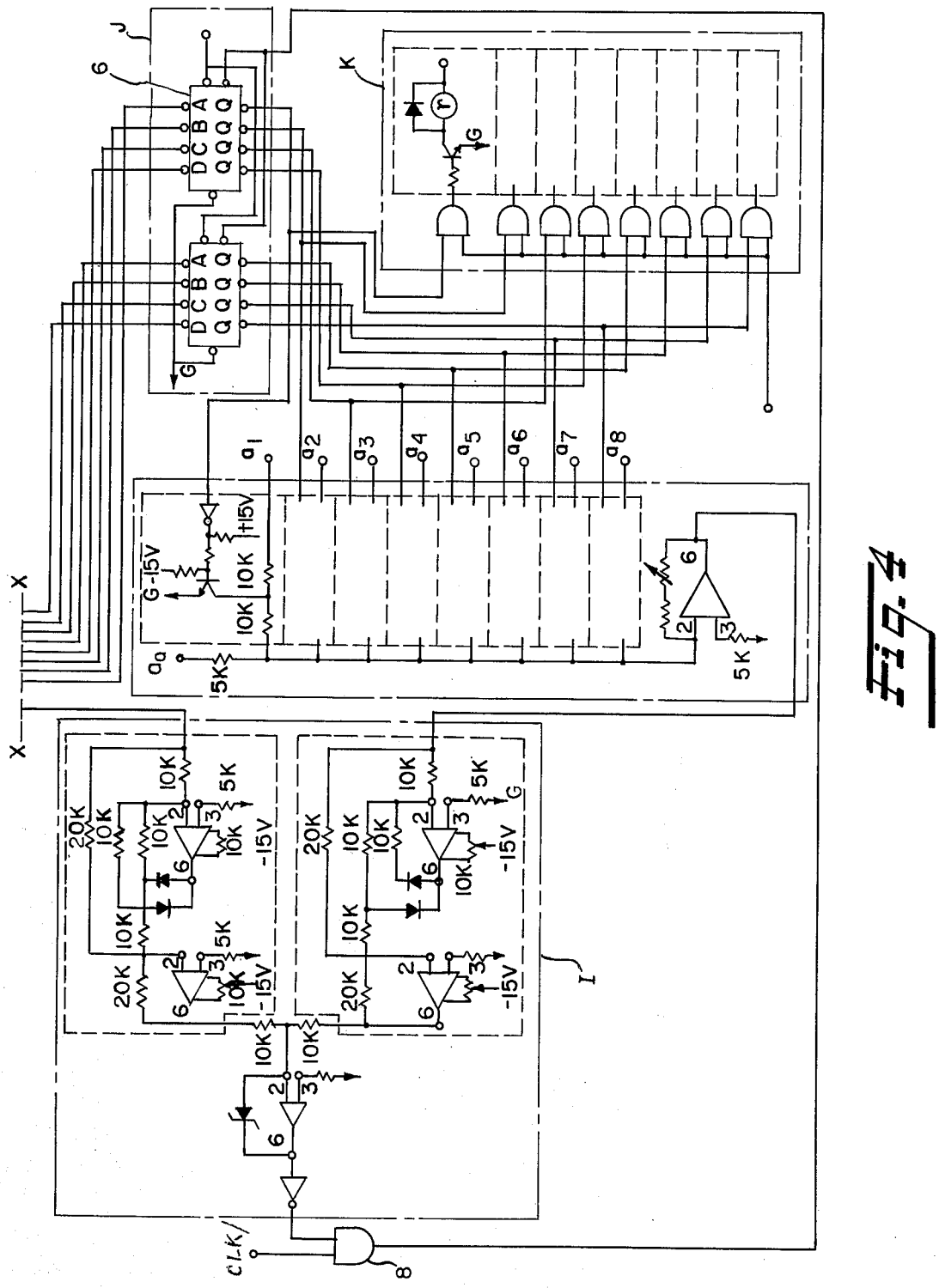
FIG. 4 is a circuit diagram of the addition code memory circuit J and the code read circuit K shown in FIG. 2.

Reference is now to be had to FIGS. 3 and 4 wherein the detailed circuitry of the units shown in FIG. 2 is shown in detail. As illustrated in FIG. 3, the addition code selecting circuit H shown in FIG. 2 comprises two sets of hexadecimal system counters 1 and 2 which constitute a counter for the address of R.O.M., to wit, a read only memory address counter, designated by reference numeral 3, which is provided with a programming of combinations, such as, for example, 225 ways, as shown in FIG. 3, and with two sets of shift registers designated by reference numerals 4 and 5. A number limiting circuit L has a number limitation commanding switch group SW, a NAND circuit group N, a Flip-Flop unit FF controlling R.O.M., and a wired OR group WO controlling the above noted Flip-Flip unit FF.

The first adder F has a circuit group comprising a transistor, a NOT circuit and resistances and an amplifying circuit. An addition code memory circuit J contains two sets of shift registers designated by reference numerals 6 and 7. A read circuit K is also provided which contains an AND circuit group and a circuit group having transistor, resistances, relay and diode units. The second added G contains in the same way as the first adder F a circuit group containing transistors, a NOT circuit and resistances and an amplifying circuit. The comparator I is a unit having a circuit which receives the outputs of the first and second adders as $-\alpha = |a_o - f_x|$ and $\beta = |a_o = g_x|$, respectively, and then puts the value under comparison between such as an H level signal where $\alpha \geq \beta$. In the circuitry just described, code output terminals 8, 9, 11 and 12 of the counter 4 and the code output terminal 12 of the counter 2 are connected to code input terminals 10, 12, 13 and 14 of the R.O.M. 3 as well as to the number limiting circuit L.

Respective switches of the number limitation commanding swith group SW are assumed to be $SW_7 \sim SW_2$ for the combination of 7, 6, 5, 4, 3 and 2 sets in downward order. Moreover, the respective NAND circuits are connected to respective counters 1 and 2 so that the output of the L level is impressed on the NAND circuit $N_7$ when the clock pulse is 0 in number on the circuit $N_6$ when the pulse is 1, on the circuit $N_5$ when the pulse is 5, on the circuit $N_4$ when the pulse is 12, on the circuit $N_3$ when the pulse is 22 and on the circuit $N_2$ when the pulse is 29 in number. Limiting numbers may be achieved with any of the desired one of the above mentioned switches being brought into contact with the NO terminals which are normally opened. The NC terminals which are normally closed and the NO terminals of the respective switches are connected to corresponding input leads of Flip-Flop unit FF by way of $WO_1 \sim WO_{10}$ respectively, with the output of the Flip-Flop unit FF being connected to the terminal 15 of the R.O.M. unit 3, with the content of the R.O.M. unit being read out by means of the L level output of the Flip-Flop unit being effected.

There are the same number of output terminals provided as beds of weighing machines, to wit, 8 terminals in the present description, which are connected to shift registers 4 and 5 of the next stage separated by four units respectively. While the shift registers 4 and 5 are set at the rising of the clock pulse CLK, the counters are set for the falling thereof. While the respective outputs of the shift registers 4 and 5 are being correspondingly connected to the respective NOT circuits, the outputs are correspondingly connected to the bases of the transistors through the resistances. The respective measured value signals ($a_1 - a_8$) from respective weighing machines $A_1 - A_8$ are correspondingly connected to the collectors of the respective transistors through resistances. All of these values are collected and are connected to the circuit of $-\alpha = |a_o - f_x|$ through an amplifying circuit. Since the input of NOT circuit corresponding to its combination attained at the level when the combination operation is effected by the first adder, the transistor will turn to the OFF position as a result of the measured value signals which are collected as a result in the analogue addition thereof. The respective outputs of the shift registers 4 and 5 are separately connected and passed to the respective shift registers 6 and 7 which constitute an addition code member circuit J.

Likewise with the first adder having the respective outputs of the shift registers 6 and 7 of the addition code memory circuit J being correspondingly connected to respective NOT circuits, the outputs thereof are collected into unity to be connected to $\beta = |a_o - g_x|$ circuit through amplifying circuit. Outputs of the above mentioned circuits $-\alpha = |a_o - f_x|$ and $\beta = |a_o - g_x|$ are then compared between one another by a comparator I containing an amplifier and a Zener diode, with the signal being put out as signals of H or L level. The signals together with the clock pulse CLK are connected to the input leads of the AND circuit 8. The output of the same is connected to the respective CLK terminals J. It will be seen that the preset value $a_o$ is changeable by changing the output voltage of a preset value changing circuit. Moreover, the output in the case of 32 clock pulses CLK enters into the counter I of the addition code selection circuit H. In the event of the whole combination operation being finished and taken out of the output terminal 9 of counter 2 as as finished calculation signals, the output is connected to one of the inputs of respective AND circuits of code read circuit K to reverse the NOT circuit to a rest position as a stop signal. The code read circuit K is connected to the base of the transistor by way of a resistance having eight sets of circuits with diode and relay units connected in parallel relation between the collector and the power source of said transistor and the key signals of the hoppers $B_1 - B_8$ of the respective weighing machines $A_1 - A_8$. Moreover, the other inputs of the respective AND circuits are correspondingly connected to the respective outputs of the respective shift registers 6 and 7 of the addition code memory circuit J.

Figures 5, 6:
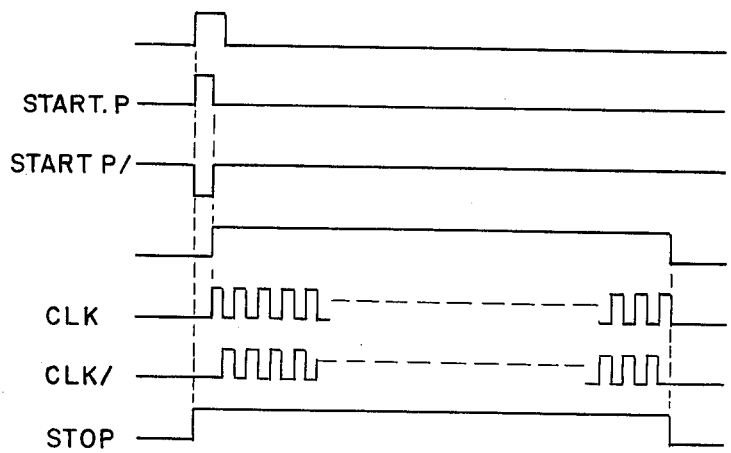
FIG. 5 illustrates a pulse wave form diagram present in the operation of the present invention.
FIG. 6 is a table of the ROM operation that may be used in the present invention.

Referring to the circuits just described, a functional example thereof is as follows:

First, at the same time as a switch corresponding to the desired number of things, such as, for example, switch $SW_5$ corresponding to 5 things, is brought into contact with the NO terminal, the setting value $a_0$ is preset. Subsequently, the calculation command switch is put to an ON position either manually or automatically. With the start pulse of the H level by the switching on of the system, counters 1 and 2 of the addition code selection circuit H are reset to zero. However, with a start pulse of L level, the respective outputs of the shift registers 6 and 7 of the addition code memory circuit J are reset to L level. Accordingly, the respective transistors of the second adder G turn to an ON position with the addition not being effected, but the output of the second adder G then corresponds to the set value $a_0$, namely $\beta = a_0$. The shift registers 4 and 5 are set at the rising of the clock pulse CLK with the counters 1 and 2 being set at a falling position thereof, and 8 ways of combinations corresponding to one address of R.O.M., as shown in FIG. 6, are effected in the period from the rise of the clock pulse to that of the next clock pulse movement. But since the output of the Flip-flop unit FF rests at an H level until 5 pulses are counted out by counters 1 and 2, the R.O.M. 3 does not yet indicate a reading out. On counting out five clock pulses CLK, the output of the NAND circuit $N_5$ attains an L level with the output of the L level attaining the L level through the wired ORs. This is to be the input of the Flip-flop unit FF. When the input of the L level enters into the Flip-flop unit FF, the output thereof turns to the L level and with such output the R.O.M. unit 3 operates so that the combination may be fed by the first adder F.

The result of this operation is converted to $-\alpha$, $-\alpha$ and $\beta$ values and are compared by the comparator 1. The output thereof attains an H level only where $\alpha < \beta$, with the memory codes of the shift registers 4 and 5 memorizing the value on the addition code memory circuit J through the output of the K level together with the clock pulse CLK. The value of addition is then transferred from the second adder G to the comparator I.

Summing up, in the course of the counters 1 and 2 counting out from 5 to 11 of the clock pulses CLK, the hereinbefore mentioned combination operation is achieved. On counters 1 and 2 counting out 12 clock pulses, the output of the Flip-flop unit FF resumes on the H level with the R.O.M. unit 3 not thereafter operating. On the 32nd pulse entering, the calculation END signal is transferred to read circuit K from the output terminal 9 of the counter 2 and finally codes memorized on the shift registers 6 and 7 of the addition code memory circuit J are read out so that weighing hoppers of the corresponding weighing machines are opened to discharge the object.

The calculation of all of the combinations in one weighing operation described above may be carried out in a very short time by the electronic circuitry. Because of combinations of weights contained in the respective weighing hoppers, objects totaling up to the preset weight can be automatically selected and taken out if only weight signals representing the contents of the weighing hoppers are derived. Further, in the case of placing limitations on the number of objects to be taken out, as well as on the total weight to be used, the number of objects put at a time in each weighing hopper may be constant and then combinations of addition codes may be made so that a desired number of objects may be extracted. Then calculations may be carried out to weigh off a desired number of objects totaling up to the preset weight. Because of the weighing system using combinations, it is necessary to determine the number of heads of the weighing machines depending upon the allowable limits of error. The higher the number of heads, the higher the accuracy attained.

Examples of the weighing operation according to the present invention will now be described.

1. Constant-Amount Weighing System

Objects to be weighed: Vegetables and fruits.
Limitations on the number of objects to be taken out: 4–6 objects.
Single-weight range: 20–45g
Preset weight: 150g
Number of heads of weighing machines: 8

Each weighing machine is charged with one object. Suppose that the following results are obtained:

| X1 | X2 | X3 | X4 | X5 | X6 | X7 | X8 |
|----|----|----|----|----|----|----|----|
| 22g | 20g | 35g | 22g | 45g | 31g | 25g | 30g |

Of all combination classes with $n = 8$, that is, ${}_8C_1 + {}_8C_2 + {}_8C_3 + {}_8C_4 + {}_8C_5 + {}_8C_6 + {}_8C_7 + {}_8C_8$ 255, the following three combination classes are calculated:

$$\left.\begin{array}{ll} 4 \text{ taken at a time:} & {}_8C_4 = 70 \\ 5 \text{ taken at a time:} & {}_8C_5 = 56 \\ 6 \text{ taken at a time:} & {}_8C_6 = 28 \end{array}\right\} 154$$

The code finally selected as a result of the weighing operation is ( X1 + X2 + X4 + X6 + X7 + X8 ), which gives six objects totaling up to 150g.

2. Addition Weighing System

Of the above-mentioned conditions, the limitations on the number of objects to be taken out are excluded. In the case of the preset weight being 1kg, an optional amount which is less than the preset weight is released as a rough weight and charged directly into the bucket E or the pool hopper D, while the remaining weight is selected on the basis of the calculation of combinations and added to said rough weight.

| Rough weight (850g) preset | | Correction charges | | | | | | | |
|---|---|---|---|---|---|---|---|---|---|
| | | X1 | X2 | X3 | X4 | X5 | X6 | X7 | X8 |
| Actually measured value 872g | 22g | 24g | 37g | 45g | 35g | 20g | 30g | 26g | |
| 1000−872 = 128g | | | | | ↓ | | | | |
| ↓ | | | | X1+X4+X5+X8 = 128g | | | | | |
| rough weight | | | | | | | | | |
| 872+128g = 1000 g | | | | | | | | | |

3. Subtraction Weighing System

In the case of the preset weight being 1kg, an optional amount which is greater than the preset weight is selected as a rough weight, while the excess is subtracted from said rough weight on the basis of the calculation of combinations.

| Rough weight (1050g) preset | | | | | | | | |
|---|---|---|---|---|---|---|---|---|
| Actually measured value (1063g) | X1 | X2 | X3 | X4 | X5 | X6 | X7 | X8 |
| | 14g | 10g | 12g | 18g | 15g | 16g | 21g | 24g |
| Inspection | | | | | | | | |
| 1063g−1000g = 63g | | | | | | | | |
| Operation for correction | | | X1−X2−X4−X8 = 63g | | | | | |
| 1063g−63g = 1000g | | | | | | | | |

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. Apparatus for making up a predetermined weight of objects from a plurality of objects comprising a plurality of weighing machines including means for feeding objects into said weighing machines, a common chute associated with said weighing machines for receiving articles discharged therefrom and a single pool hopper for collecting the objects from said common chute, an addition code selected circuit associated with said weighing machines for determining the combinations of actually measured values provided by said plurality of weighing machines and to calculate the combinations thereof, a first adder for selectively adding together a plurality of actually measured values in accordance with a command given by said addition code selecting circuit and thereby providing an output corresponding to the absolute value of the difference from the predetermined weight, a second adder for adding together the actually measured values including the one of the preceding combinations which most approximates that of the predetermined weight and thereby providing an output value corresponding to the absolute value of the difference from the predetermined weight, a comparator for comparing the outputs from said first and second adders, an addition code memory circuit for memorizing the combination code present in the first adder only when the output from the first adder is smaller than the output from the second adder, and a code reading circuit for reading the combination code memorized in the addition code memory circuit to release the weighing hoppers of the weighing machines corresponding to said codes in question.

* * * * *